(12) United States Patent
Churnock et al.

(10) Patent No.: US 11,048,311 B1
(45) Date of Patent: Jun. 29, 2021

(54) POWER SYSTEM FOR MULTI-INPUT DEVICES WITH SHARED RESERVE POWER

(71) Applicant: Amazon Technologies, Inc., Seattle, WA (US)

(72) Inventors: Paul Andrew Churnock, O'Fallon, IL (US); Nigel Martin McGee, Ashburn, VA (US); Stephen Holden, Buckley, CA (US); Ryan Parfait, Lynnwood, WA (US); Colin Whittaker, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 184 days.

(21) Appl. No.: 15/882,944

(22) Filed: Jan. 29, 2018

(51) Int. Cl.
  *G06F 1/26*   (2006.01)
  *H02J 9/06*   (2006.01)
  *G06F 1/30*   (2006.01)

(52) U.S. Cl.
  CPC ............... *G06F 1/263* (2013.01); *G06F 1/30* (2013.01); *H02J 9/061* (2013.01); *H02J 9/068* (2020.01)

(58) Field of Classification Search
  CPC .. G06F 1/263; G06F 1/30; H02J 9/061; H02J 2009/068
  See application file for complete search history.

(56) References Cited

U.S. PATENT DOCUMENTS

| | | | |
|---|---|---|---|
| 4,060,735 A | 11/1977 | Pascucci et al. | |
| 5,583,440 A | 12/1996 | Bisher | |
| 5,675,194 A | 10/1997 | Domigan | |
| 5,745,356 A | 4/1998 | Tassitino, Jr. et al. | |
| 5,770,897 A | 6/1998 | Bapat et al. | |
| 6,191,500 B1 | 2/2001 | Toy | |
| 6,304,006 B1 | 10/2001 | Jungreis | |
| 6,433,444 B1 | 8/2002 | de Vries | |
| 6,628,009 B1 * | 9/2003 | Chapel | H02J 3/26 307/14 |
| 6,992,247 B2 | 1/2006 | Rasmussen et al. | |
| 7,197,888 B2 | 4/2007 | LeClear et al. | |
| 7,265,458 B2 | 9/2007 | Edelen et al. | |

(Continued)

OTHER PUBLICATIONS

U.S. Appl. No. 14/204,855, filed Mar. 11, 2014, Peter George Ross.

(Continued)

*Primary Examiner* — Aurel Prifti
(74) *Attorney, Agent, or Firm* — Robert C. Kowert; Kowert, Hood, Munyon, Rankin & Goetzel, P.C.

(57) ABSTRACT

A power system for multi-input devices with shared reserve power includes a first automatic transfer switch (ATS) and a second ATS each coupled at respective inputs to a primary power system and a reserve power system. An output of one of the ATSs is coupled to first power input of a multi-input electrical device and an output of the other ATS is coupled to a second power input of the multi-input electrical device. When primary power is available, electrical power is fed to both the inputs of the multi-input electrical device and when primary power is not available reserve power is fed to both inputs of the multi-input electrical device. If a component fails between the primary and/or reserve power system and the multi-input electrical device, a full load of the multi-input electrical device is fed from a non-affected one of the inputs of the multi-input electrical device.

20 Claims, 10 Drawing Sheets

(56) References Cited

U.S. PATENT DOCUMENTS

| | | | |
|---|---|---|---|
| 7,459,803 B2 | 12/2008 | Mosman | |
| 7,472,290 B2 | 12/2008 | Diab et al. | |
| 7,478,251 B1 | 1/2009 | Diab et al. | |
| 7,514,815 B2 | 4/2009 | Paik et al. | |
| 7,521,884 B2 | 4/2009 | Filippenko | |
| 7,560,831 B2 * | 7/2009 | Whitted | H02J 9/061 |
| | | | 307/64 |
| 7,565,555 B2 | 7/2009 | Diab | |
| 7,566,988 B2 | 7/2009 | Herber et al. | |
| 7,616,432 B2 | 11/2009 | Luebke et al. | |
| 7,642,676 B2 | 1/2010 | Washington | |
| 7,661,459 B2 | 2/2010 | Wesley et al. | |
| 7,888,816 B2 | 2/2011 | Zajkowski | |
| 7,939,968 B2 | 5/2011 | Hjort et al. | |
| 7,982,338 B2 | 7/2011 | O'Leary | |
| 7,991,588 B1 * | 8/2011 | Krieger | G06F 1/26 |
| | | | 702/186 |
| 8,108,699 B2 | 1/2012 | Diab | |
| 8,173,898 B2 | 5/2012 | Rasmussen et al. | |
| 8,212,401 B2 | 7/2012 | Linkhart et al. | |
| 8,212,427 B2 | 7/2012 | Spitaels et al. | |
| 8,222,548 B2 | 7/2012 | Espeut, Jr. | |
| 8,251,785 B2 | 8/2012 | Schmitt et al. | |
| 8,294,297 B2 | 10/2012 | Linkhart et al. | |
| 8,447,569 B1 | 5/2013 | Marwah et al. | |
| 8,639,459 B1 * | 1/2014 | Morales | G06F 1/28 |
| | | | 702/62 |
| 9,041,250 B1 * | 5/2015 | Czamara | G06F 1/28 |
| | | | 307/64 |
| 9,081,568 B1 * | 7/2015 | Ross | H02J 9/062 |
| 9,342,414 B1 * | 5/2016 | Nguyen | G06F 11/2015 |
| 9,485,887 B1 * | 11/2016 | Eichelberg | H05K 7/1497 |
| 9,537,351 B2 * | 1/2017 | Lee | H02J 9/061 |
| 9,720,476 B1 * | 8/2017 | Nguyen | G06F 1/263 |
| 9,793,752 B1 | 10/2017 | Morales et al. | |
| 9,846,467 B2 | 12/2017 | Gardner et al. | |
| 9,857,855 B2 | 1/2018 | Kaplan | |
| 9,871,406 B1 * | 1/2018 | Churnock | G06F 1/30 |
| 9,997,955 B1 * | 6/2018 | Ross | H02J 1/001 |
| 10,001,825 B2 | 6/2018 | Morales et al. | |
| 10,014,713 B1 | 7/2018 | Nguyen | |
| 10,031,570 B2 | 7/2018 | Morales et al. | |
| 10,175,737 B1 * | 1/2019 | Kong | G01R 21/133 |
| 10,608,466 B1 * | 3/2020 | Wildstone | H02J 9/061 |
| 10,615,635 B1 * | 4/2020 | Desantis | H01R 31/065 |
| 2004/0201282 A1 | 10/2004 | Kado et al. | |
| 2005/0200205 A1 | 9/2005 | Winn et al. | |
| 2007/0046103 A1 * | 3/2007 | Belady | H02G 3/00 |
| | | | 307/12 |
| 2007/0118772 A1 | 5/2007 | Diab | |
| 2008/0116898 A1 | 5/2008 | Washington | |
| 2008/0120187 A1 | 5/2008 | Wesley et al. | |
| 2008/0303347 A1 | 12/2008 | Zajkowski | |
| 2009/0009001 A1 | 1/2009 | Marwali et al. | |
| 2009/0033153 A1 * | 2/2009 | Linkhart | H02J 9/06 |
| | | | 307/64 |
| 2009/0314541 A1 | 12/2009 | Jones et al. | |
| 2009/0314889 A1 | 12/2009 | Baatz et al. | |
| 2010/0235671 A9 | 9/2010 | Jain | |
| 2011/0049980 A1 | 3/2011 | Paik et al. | |
| 2011/0068625 A1 * | 3/2011 | Duan | G06F 11/2015 |
| | | | 307/29 |
| 2011/0187197 A1 | 8/2011 | Moth | |
| 2011/0260538 A1 * | 10/2011 | Huang | H02J 9/062 |
| | | | 307/64 |
| 2012/0000975 A1 * | 1/2012 | Heath | G06Q 10/087 |
| | | | 235/375 |
| 2012/0068541 A1 | 3/2012 | Anderson | |
| 2012/0190553 A1 | 5/2012 | Hancock et al. | |
| 2012/0181869 A1 * | 7/2012 | Chapel | H02J 9/06 |
| | | | 307/64 |
| 2012/0205986 A1 * | 8/2012 | Frampton | H02J 3/381 |
| | | | 307/84 |
| 2012/0331477 A1 | 12/2012 | Zeighami et al. | |
| 2013/0049476 A1 * | 2/2013 | Lathrop | H02J 9/066 |
| | | | 307/80 |
| 2014/0054966 A1 * | 2/2014 | Jain | H02J 9/00 |
| | | | 307/65 |
| 2014/0208130 A1 * | 7/2014 | Morales | G06F 1/30 |
| | | | 713/300 |
| 2015/0074431 A1 * | 3/2015 | Nguyen | H02J 9/06 |
| | | | 713/300 |
| 2015/0234440 A1 * | 8/2015 | Gardner | G06F 1/30 |
| | | | 713/300 |
| 2015/0319878 A1 * | 11/2015 | Morales | H05K 7/20709 |
| | | | 361/679.46 |
| 2015/0331467 A1 * | 11/2015 | Kaplan | H02B 1/22 |
| | | | 713/300 |
| 2015/0378408 A1 * | 12/2015 | Kaplan | H05K 7/1492 |
| | | | 713/300 |
| 2016/0118802 A1 * | 4/2016 | Castillo | H02J 4/00 |
| | | | 307/18 |
| 2016/0248273 A1 * | 8/2016 | Carroll | H02J 9/061 |
| 2017/0126056 A1 * | 5/2017 | Chan | H02M 7/42 |
| 2017/0185495 A1 * | 6/2017 | Jau | G06F 11/2015 |
| 2017/0201122 A1 * | 7/2017 | Arduini | H02M 7/04 |
| 2018/0062426 A1 * | 3/2018 | Kha | H02J 9/061 |

OTHER PUBLICATIONS

U.S. Appl. No. 15/871,817, filed Jan. 15, 2018, Paul Andrew Churnock et al.

* cited by examiner

US 11,048,311 B1

POWER SYSTEM FOR MULTI-INPUT DEVICES WITH SHARED RESERVE POWER

BACKGROUND

Organizations such as on-line retailers, Internet service providers, search providers, financial institutions, universities, and other computing-intensive organizations often conduct computer operations from large scale computing facilities. Such computing facilities house and accommodate a large amount of server, network, and computer equipment to process, store, and exchange data as needed to carry out an organization's operations. Typically, a room of a facility includes many racks, which may include server racks, networking racks, etc. Each rack, in turn, may include many electrical devices such as computer systems, servers, associated computer equipment, networking devices, etc.

In some facilities, an electrical device may receive electrical power from a primary power system and an additional secondary power system that is fully redundant at all levels of the power system with the primary power system. Such a level of redundancy for the systems and components of the primary and fully-redundant secondary power system may be referred to as "2N" redundancy. For example, in a data center, electrical devices mounted in one or more racks may receive power from a primary power system and from a fully-redundant secondary power system. The secondary power system may have an uninterruptible power supply, floor power distribution unit, and rack power distribution unit that mirrors a corresponding uninterruptible power supply, floor power distribution unit, and rack power distribution unit in the primary power system. Providing full redundancy of the power systems may, however, be costly both in terms of capital costs and in terms of costs of operation and maintenance.

Alternatively, some data centers may include a back-up system that is less than fully redundant. Such a level of redundancy for the systems and components supported by the primary and the less than fully-redundant back-up system may be referred to as "N+1" redundancy. For example, an automatic transfer switch may switch between a primary power system and a back-up power system at a point upstream of an electrical load where at least some non-redundant components distribute electrical power from the automatic transfer switch to the electrical load. However, because the back-up system is not fully redundant, a single point failure downstream of the automatic transfer switch may cause loss of power at electrical devices that receive power from the N+1 power system.

Figure 1:
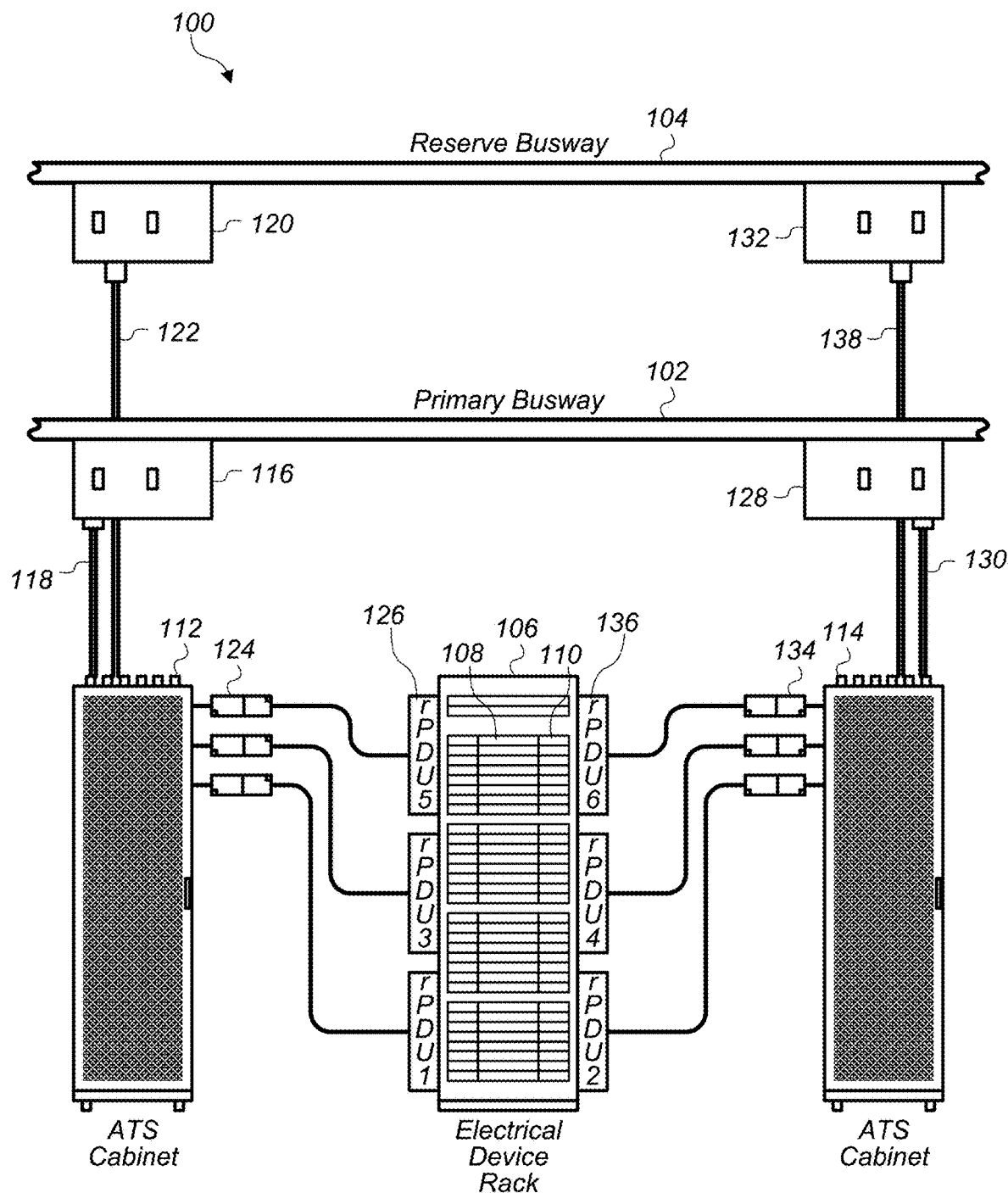
FIG. 1 illustrates a data center comprising electrical devices with multi-input power supplies with and a power system for multi-input devices with shared reserve power configured to supply electrical power to multiple inputs of the multi-input power supplies from a single primary power system or from a reserve power system, according to some embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of power systems for multi-input devices with shared reserve power are disclosed. According to some embodiments, a data center includes racks of electrical devices that comprise multi-input power supplies, wherein the racks are arranged into aisles. The data center also includes multiple primary electrical power systems configured to supply electrical power to the electrical devices. The primary power systems are arranged such that electrical devices mounted in racks in different aisles are supplied electrical power from different ones of the primary electrical power systems. The data center also includes a reserve power system configured to provide reserve power support to electrical devices mounted in multiple ones of the aisles. Additionally, the data center includes a first group of automatic transfer switches associated with one of the aisles. The automatic transfer switches of the first group are electrically coupled to one of the primary electrical power systems associated with the aisle and are electrically coupled to the reserve power system. The automatic transfer switches of the first group are also electrically coupled to respective electrical devices of the aisle via respective first inputs of respective multi-input power supplies of the electrical devices of the aisle. For example the first group of automatic transfer switches may be mounted in a first automatic transfer switch cabinet that supports electrical devices in an aisle associated with the first group of automatic transfer switches. The data center also includes a second group of automatic transfer switches associated with the same aisle that is associated with the first group of automatic transfer switches. The automatic transfer switches of the second group are electrically coupled to the primary electrical power system that is also coupled to the first group of automatic transfer switches. Also, the automatic transfer switches of the second group are electrically coupled to the reserve power system and the respective electrical devices of the aisle via respective second inputs of the respective multi-input power supplies of the respective electrical devices of the aisle.

In some embodiments, the first group of automatic transfer switches and the second group of automatic transfer switches are configured to concurrently feed electrical power to the electrical devices of the aisle via respective inputs of the multi-input power supplies of the electrical devices of the aisle. Also, the automatic transfer switches of the first group and the second group may be configured to automatically switch to feed electrical power from the reserve power system in response to a loss of power from the primary power system associated with the aisle. Additionally, the automatic transfer switches of the first group and the second group may be configured to concurrently feed electrical power to the electrical devices of the aisle from the reserve power system via respective inputs of the multi-input power supplies of the electrical devices of the aisle. Additionally, in response to a power system component failure downstream of the primary power system or downstream of the reserve power system, a remaining one of the automatic transfer switches of the first group or the second group with a non-failed connection to an electrical device may be configured to supply a full load of the electrical device either from the primary power system or the reserve power system.

According to some embodiments, a system includes an electrical device comprising a multi-input power supply, a primary electrical power system configured to supply electrical power to the electrical device, and a reserve power system configured to provide reserve power support to the electrical device. The system also includes a first automatic transfer switch electrically coupled to the primary electrical power system and the reserve power system. The first automatic transfer switch is also electrically coupled to the electrical device via a first input of the multi-input power supply of the electrical device. Additionally, the system includes a second automatic transfer switch electrically coupled to the primary electrical power system and the reserve power system. The second automatic transfer switch is also electrically coupled to the electrical device via a second input of the multi-input power supply of the electrical device. In some embodiments, the first automatic transfer switch and the second automatic transfer switch may be configured to concurrently feed electrical power to the electrical device via the first and second inputs of the multi-input power supply of the electrical device from the primary power system and in response to a loss of power from the primary power system, concurrently feed electrical power to the electrical device via the first and second inputs of the multi-input power supply of the electrical device from the reserve power system.

According to some embodiments, a method includes feeding electrical power to an electrical device from a primary power system via a first automatic transfer switch coupled to the primary power system and feeding electrical power to the electrical device from the same primary power system via a second automatic transfer switch coupled to the primary power system. The method also includes feeding, in response to a loss of power from the primary power system, electrical power to the electrical device from a reserve power system via the first automatic transfer switch and via the second automatic transfer switch.

As used herein, "computer room" means a room of a building in which computer systems, such as rack-mounted servers, and/or networking devices, such as routers and switches are operated.

As used herein, "data center" includes any facility or portion of a facility in which computer operations are carried out. A data center may include servers dedicated to specific functions or serving multiple functions and/or networking devices such as routers, switches, etc. Examples of computer operations include information processing, communications, simulations, and operational control.

As used herein, "electrical power" means power that can be used by one or more electrical devices, such as networking system components or computer system components. Electrical power may be stepped down in a power distribution unit or in elements downstream from the power distribution units. For example, an electrical device power supply may step down electrical power voltages (and rectify alternating current to direct current).

As used herein, providing power "support" refers to providing one or more power feeds to be available to one or more downstream systems and components, including one or more electrical loads. Such provided power feeds may be precluded from being received by the systems and components but may be made available for receipt based at least in part upon a positioning of one or more components upstream of the systems and components. For example, a reserve power system may provide reserve power support to an electrical load by providing a reserve power feed that can be selectively routed to the load by an automatic transfer switch that is downstream of the reserve power system and upstream of the load, where the automatic transfer switch may selectively route the reserve power feed or a primary power feed to the load based at least in part upon one or more conditions associated with the primary power feed.

As used herein, "a rack power distribution unit", also referred to herein as a "rack PDU", means a device, module, component, or combination thereof, which can be used to distribute electrical power in a rack. The elements of a rack power distribution unit may be embodied within a single component or assembly (such as a transformer and a power distribution unit housed in a common enclosure), or may be distributed among two or more components or assemblies (such as a transformer and a power distribution unit each housed in separate enclosure, and associated cables, etc.).

As used herein, "primary power" means power that can be supplied to an electrical load, for example, during normal operating conditions. A power distribution system (also referred to herein as a "power system") that distributes primary power may be referred to as a primary power system.

As used herein, "floor power distribution unit" refers to a power distribution unit that can distribute electrical power to various components in a data center room. In certain embodiments, a floor power distribution unit includes a k-rated transformer. A floor power distribution unit may be housed in an enclosure, such as a cabinet.

As used herein, "reserve power" means power that can be supplied to an electrical load upon the failure of, or as a substitute for, primary power to the load. A power distribution system (also referred to herein as a "power system") that distributes reserve power may be referred to as a reserve power system.

As used herein, "source power" includes power from any source, including but not limited to power received from a utility feed. In certain embodiments, "source power" may be received from the output of another transformer.

As used herein, "computing device" includes any of various computer systems or components thereof. One example of a computer device is a rack-mounted server. As used herein, the term computer or computing device is not limited to just those integrated circuits referred to in the art as a computer, but broadly refers to a processor, a server, a microcontroller, a microcomputer, a programmable logic controller (PLC), an application specific integrated circuit, and other programmable circuits, and these terms are used interchangeably herein. In the various embodiments, memory may include, but is not limited to, a computer-readable medium, such as a random access memory (RAM). Alternatively, a compact disc-read only memory (CD-ROM), a magneto-optical disk (MOD), and/or a digital versatile disc (DVD) may also be used. Also, additional input channels may include computer peripherals associated with an operator interface such as a mouse and a keyboard. Alternatively, other computer peripherals may also be used that may include, for example, a scanner. Furthermore, in the some embodiments, additional output channels may include an operator interface monitor and/or a printer.

Some facilities may include one or more rooms, such as computing rooms. Additionally, the rooms may include a large number of electrical devices that place respective electrical loads on a power system in order to operate the electrical devices, for example the electrical devices may be computing devices or networking devices in some embodiments. Because a room of a facility may contain a large number of electrical devices, a large amount of electrical power may be required to operate the room of the facility. In addition, the electrical power may be distributed to a large number of locations spread throughout a room (e.g., many racks spaced from one another, and many electrical devices in each rack). Usually, a large-scale computing facility receives a power feed at a relatively high voltage. This power feed is stepped down to a lower voltage (e.g., 208V). A network of cabling, bus bars, power connectors, and power distribution units, is used to deliver the power at the lower voltage to numerous specific components in the facility, such as electrical devices in multiple rooms of the facility.

As discussed above, some facilities may utilize "2N" power systems wherein a primary power system and a fully redundant secondary power system feed power to multi-input electrical loads in such facilities. In such systems, electrical loads receive a portion of their operating power from the primary power system and another portion of their operating power from the secondary power system. For example a server with a multi-input power supply may receive approximately 50% of the server's operating power from a primary power system and approximately 50% of the server's operating power from a secondary power system (some systems may utilize other distributions, e.g. 60:40, 80:20, etc.). In such systems, both the primary power system and the secondary power system are sized to have sufficient power capacity to support the full load of the electrical devices that receive power from the "2N" power system. For example, a primary power system and a secondary power system may each be sized to support the full load of electrical devices connected to the primary and secondary power systems by transitioning either the primary power system or the secondary power system from feeding a portion of the load of the electrical devices (e.g. 50%) to instead feeding the full load of the electrical devices (e.g. 100%).

However, in order to be able to provide such support "2N" systems require significant amounts of reserved capacity that is rarely used. For example, in such systems both the primary and the secondary power systems are sized to support a greater electrical load than is required for normal operation. This may be costly in terms of capital costs to install the system components and in terms of operating costs to maintain the system components. For example primary power system components and secondary power system components, such as uninterruptible power supplies, floor power distribution units, power busses and cabling, transformers, etc. may be sized for a failure scenario (e.g. supplying a full load), but may rarely operate in a failure scenario. Thus, for a significant portion of the time the "2N" power system is in operation, the components of the primary power system and the secondary power system may be underutilized. The underutilized capacity may be referred to as a "swing capacity," wherein a significant amount of power distribution capacity is reserved as "swing capacity" for failures but is rarely used.

In some embodiments, a power system for multi-input devices with shared reserve power, as described herein, may provide equivalent failover redundancy as a "2N" power system with fully redundant primary and secondary power systems, while allowing a greater portion of the capacity of the primary system to be used to provide power to downstream electrical loads under normal operating conditions.

For example, a power system for multi-input devices with shared reserve power may feed both a first and a second input of a multi-input power supply of an electrical device with electrical power from a single primary power system. Thus increasing utilization of the primary power system. Additionally, in order to maintain an equivalent failover redundancy as a "2N" power system, the multi-input power system with shared reserve power may include redundant automatic transfer switches between the primary power system and multiple ones of the respective inputs of the multi-input power supply of the electrical device. The redundant automatic transfer switches may be each coupled to the primary power system at a first input of the automatic transfer switches, coupled to a shared reserve power system at a second input of the automatic transfer switches, and coupled to one of the inputs of the multi-input power supplies of the electrical device at an output of the automatic transfer systems. The multi-input power supply of the electrical device may be coupled to different ones of the redundant automatic transfer switches (ATSs) via its respective first and second inputs. For example an outlet of a first ATS that is coupled to the primary power system and the reserve power system may be coupled to a first input of a multi-input power supply and an outlet of a second ATS that is coupled to the primary power system and the reserve power system may be coupled to a second input of the multi-input power supply. Thus, a failure of either one or the ATSs does not result in a loss of power to the electrical device including the multi-input power supply because a remaining ATS may supply the full load of the electrical device from the primary power system or the reserve power system. Also, a failure at a connection to the primary power system or the reserve power system for either of the ATSs or a failure between one of the ATSs and the multi-input power supply of the electrical device does not result in a loss of power to the electrical device because a remaining (unaffected ATS connection) may supply the full load of the electrical device from the primary power system or the reserve power system.

In some embodiments, the reserve power system may be a shared reserve power system that provides reserve power support to multiple primary power systems. In some embodiments, the reserve power system may be "oversubscribed." As used herein, "oversubscribed" refers to a condition in which total power requirements of the systems, such as electrical devices, coupled to a reserve power system exceed the capacity of the reserve power system (which includes, for example, exceeding the capacity of a subsystem such as a reserve UPS). For example, a reserve power system might have five aisles of rack systems coupled to it, but only be able to provide reserve power to one of the aisles of rack systems at any given time. In some embodiments, a reserve power system may be heavily oversubscribed (for example, subscribed at several times the capacity of the reserve power system). In certain embodiments, oversubscription is applied at a facility-wide level. For example, in some embodiments, a reserve power system may be sized to provide electrical power for a full load of a single primary power system, but may provide reserve power support for multiple primary power systems. In some embodiments, a reserve power system may be sized to provide electrical power for some (e.g. more than one) full loads of primary power systems for which it provides reserve power support, but not for all of the primary power systems for which it provides reserve power support at the same time.

Because, in some embodiments, a reserve power system of a power system for multi-input devices with shared reserve power is "oversubscribed" the amount of reserved swing capacity needed to provide reserve power support to electrical devices connected to a given primary power system may be shared among multiple primary power systems. For example, in the case of a "2N" system each "2N" systems may include swing capacity that is reserved for that "2N" system, wherein the swing capacity is not available for use by other "2N" systems. In contrast, a power system for multi-input devices with shared reserve power may share a "reserve capacity" of the reserve power system amongst multiple primary power systems. For example, in some embodiments, as many as 12 primary power systems may share a common reserve power system. Thus, instead of each primary power system of a facility including an underutilized "swing capacity," a power system for multi-input devices with shared reserve power may allow each primary power system to be operated at or near its full capacity while reserving a reserve capacity of a shared reserve power system that is shared amongst multiple (more than one) primary power systems. This may result in an overall higher utilization of the capacities of the primary power systems and the reserve power system than is achieved by a similar number of primary power systems and secondary power systems of "2N" power systems, while providing equivalent failover redundancy as the "2N" power systems.

Additionally, in some embodiments, a power system for multi-input power systems with shared reserve power may permit power systems to be added to a facility in smaller capacity increments than are required when adding power capacity for a "2N" power system. For example, in a "2N" power system the addition of a primary power system may require the addition of a fully redundant secondary power system. Thus, "2N" power systems may require capacity increases in terms of total capacity that are twice a nominal increase in normal operating capacity. In contrast, a power system for multi-input devices with shared reserve power may allow for smaller incremental capacity increases, wherein added total capacity is equal to a nominal increase in normal operating capacity.

For example, an already installed reserve power system may support multiple primary power systems. Thus, to increase a nominal normal operating capacity of a power system for multi-input devices with shared reserve power, an additional primary power system may be added without adding an additional reserve power system. For example, an already installed reserve power system may provide reserve power support to a newly added primary power system.

As another example, a "2N" power system may include a primary power system with a two megawatt capacity and a secondary power system with a two megawatt capacity. In such an arrangement, adding an additional two megawatt primary power system may require installing power system components with a total capacity of four megawatts (e.g. two megawatts for the primary power system and two megawatts for the secondary power system). In contrast, adding an additional primary power system to a multi-input power system with shared reserve power may only require the addition of power system components with a two megawatt capacity, which is the capacity of the added primary power system. In such embodiments, an already installed reserve power system may provide reserve power support for the newly installed primary power system with the two megawatt capacity.

Also, a power system with multi-input devices with shared reserve power may increase the nominal loading of primary power system components and thus require fewer overall power components then comparable "2N" power systems. For example, whereas a "2N" power system may include an uninterruptible power system (UPS) in the primary power system and an UPS in the secondary power system for multiple primary and secondary power systems. A power system for multi-input devices with shared reserve power may include a UPS in each primary power system and a UPS in a shared reserve power system. As an example, consider a facility with 12 primary power systems. Such a facility if configured in a "2N" arrangement may include 24 UPSs (12 primary and 12 secondary), whereas a power system for multi-input devices with shared reserve power may include 13 UPSs (12 primary and 1 reserve). Thus a power system for multi-input devices with shared power may result in less capital costs to install and less costs to maintain than similarly sized "2N" systems.

FIG. 1 illustrates a data center comprising electrical devices with multi-input power supplies and a power system for multi-input devices with shared reserve power configured to supply electrical power to multiple inputs of the multi-input power supplies from a single primary power system or from a reserve power system, according to some embodiments.

Data center 100 includes primary power busway 102 and reserve power busway 104. Data center 100 also includes electrical device rack 106 comprising electrical devices 108, wherein at least some of the electrical devices 108 include multiple input power supplies 110. Data center 100 also includes automatic transfer switch (ATS) cabinets 112 and 114. ATS cabinet 112 includes automatic transfer switches coupled at a first input to primary power busway 102 via tap box 116 and whip 118 and coupled at a second input to reserve power busway 104 via tap box 120 and whip 122. Respective ones of the ATSs of ATS cabinet 112 are electrically coupled to electrical devices 108 in rack 106 via whips 124 coupled to rack power distribution units (PDUs) 126.

Additionally, ATS cabinet 114 includes automatic transfer switches coupled at a first input to primary power busway 102 via tap box 128 and whip 130 and coupled at a second input to reserve power busway 104 via tap box 132 and whip 138. Respective ones of the ATSs of ATS cabinet 114 are electrically coupled to electrical devices 108 in rack 106 via whips 134 coupled to rack PDUs 136. Each of the ATS cabinets 112 and 114 includes a group of ATSs that feed electrical power to a set of one or more electrical devices 108 coupled to one of rack PDUs 126.

In some embodiments, an internal wiring arrangement of electrical devices 108 and rack power distribution units 126 and 136 may be the same or similar as a wiring arrangement of an electrical device rack in a "2N" system. However, instead of rack PDUs 126 being coupled to a primary power system and rack PDUs 136 being coupled to a secondary power system (as would be the case in a "2N" system) rack PDUs 126 and 136 may be both electrically coupled to primary power busway 102 when primary power is available and may both be automatically switched to being coupled to reserve power busway 104 when primary power is not available. Additionally, if a power system component fails downstream of primary power busway 102 or reserve power busway 104, electrical devices 108 may continue to receive a full electrical load from another one of the multiple input connections of the multi-input power supplies 110. For example, if tap box 116, ATS cabinet 112 (or an ATS in ATS cabinet 112), one of whips 124, or one of rack power distribution units 126 were to fail, an affected electrical device 108 may receive its full power load via tap box 132 or tap box 128 via an ATS of ATS cabinet 114, a whip 134, and a rack PDU 136 coupled to the other one it the multiple inputs of the multi-input power supply 110 of the electrical device 108.

In some embodiments, racks 106 may be server racks and electrical devices 108 may be servers, such as compute servers, storage servers, etc. In some embodiments, rack 106 may be a networking rack and electrical devices 108 may be networking devices, such as routers, networking switches, load balancers, etc. In some embodiments, a power system for multi-input devices with shared reserve power may supply power to other types of multi-input devices. In some embodiments, a multi-input power supply may have a sufficient stored power capacity or capacitance to supply uninterrupted power to electrical devices for 12-16 milliseconds while an automatic transfer switch is switching power inputs.

Figure 2A:
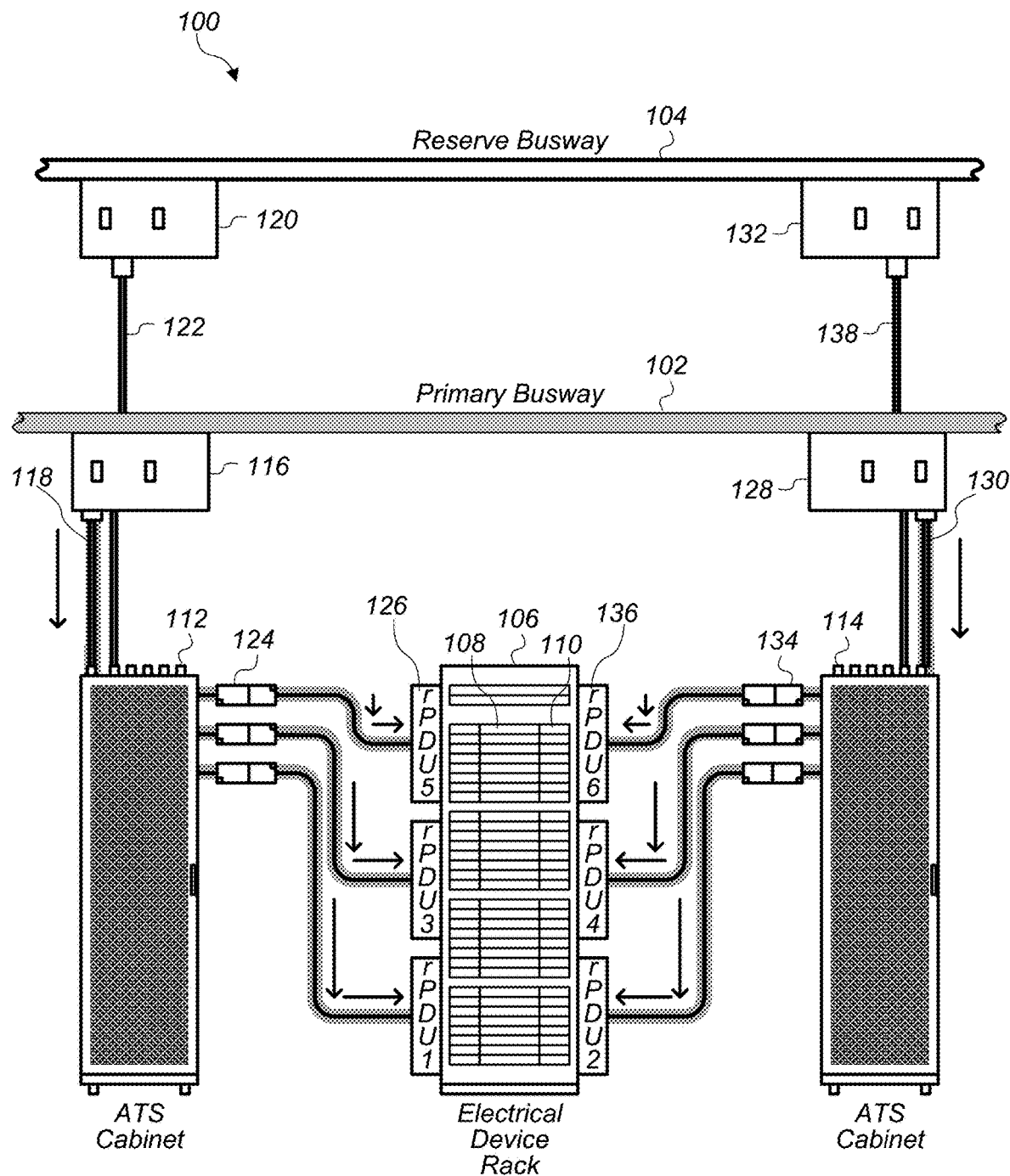
FIG. 2A illustrates electrical devices with multi-input power supplies receiving electrical power from a single primary power system via more than one power input of the multi-input power supplies of the electrical devices, according to some embodiments.

FIG. 2A illustrates electrical devices with multi-input power supplies receiving electrical power from a single primary power system via more than one power input of the multi-input power supplies of the electrical devices, according to some embodiments.

For example, under normal operating conditions electrical devices 108 mounted in rack 106 may receive a portion of their operating power from primary power system 102 via tap box 116, whip 118, ATSs of ATS cabinet 112, whips 124, and rack PDUs 126. Concurrently, the electrical devices 108 of rack 106 may receive another portion of their operating power from primary power system 102 via tap box 128, whip 130, ATSs of ATS cabinet 114, whip 134, and rack PDUs 136. Each of the electrical devices 108 may be coupled to one of rack PDUs 126 via a first input of multi-input power supplies 110 of the electrical devices 108 and may also be coupled to one of rack PDUs 136 via another input of the multi-input power supplies 110 of electrical devices 108. Thus each of electrical devices 108 may have multiple independent connections to primary power busway 102 and reserve busway 104 via ATS cabinet 112 and via ATS cabinet 114.

Because both of the inputs of multi-input power supplies 110 of respective ones of electrical devices 108 are coupled to primary power system 102 under normal operating conditions, power utilization of primary power system 102 is increased as compared to a "2N" arrangement.

Figure 2B:
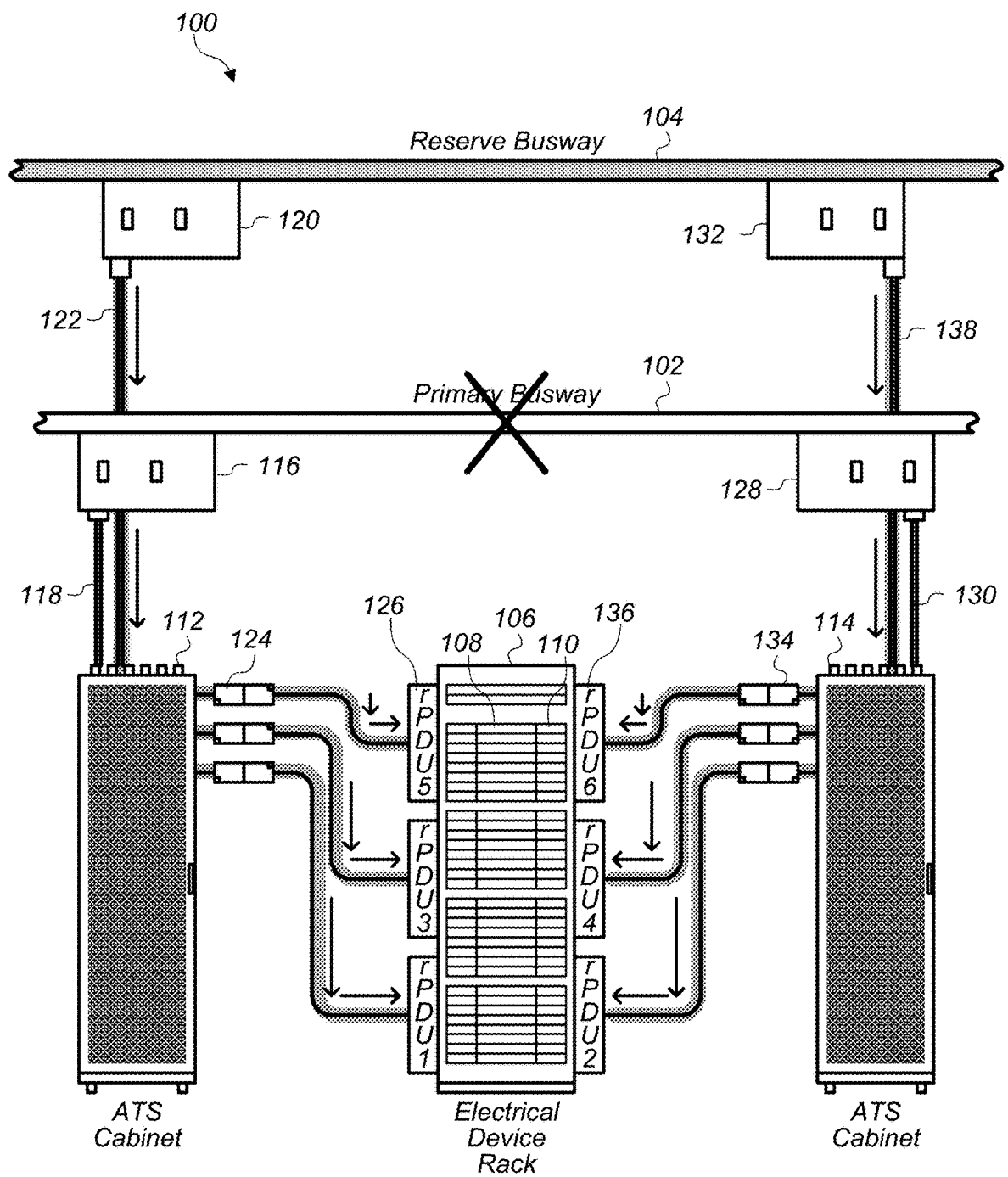
FIG. 2B illustrates electrical devices with multi-input power supplies receiving electrical power from a reserve power system, in response to a loss of power from the primary power system, wherein the electrical power from the reserve power system is received via more than one power input of the multi-input power supplies of the electrical devices, according to some embodiments.

FIG. 2B illustrates electrical devices with multi-input power supplies receiving electrical power from a reserve power system, in response to a loss of power from the primary power system, wherein the electrical power from the reserve power system is received via more than one power input of the multi-input power supplies of the electrical devices, according to some embodiments.

If power is lost from primary power busway 102, for example due to a failure of primary power busway 102, a failure of an upstream component that distributes power to primary power busway 102, or due to a loss of a power source that supplies power to primary power busway 102, the ATSs of ATS cabinet 112 and the ATSs of ATS cabinet 114 may selectively switch from receiving electrical power from primary power busway 102 to instead receiving electrical power from reserve power busway 104.

In some embodiments, a power system for multi-input devices with shared reserve power may include failure redundancy in case a component downstream of a primary power system or a reserve power system fails. For example, when feeding electrical power from primary power busway 102 as illustrated in FIG. 2A or when feeding electrical power from reserve power busway 104 as illustrated in FIG. 2B, electrical devices 108 are connected to the respective busways via independent electrical paths through respective ones of ATS cabinet 112 or ATS cabinet 114.

Figure 2C:
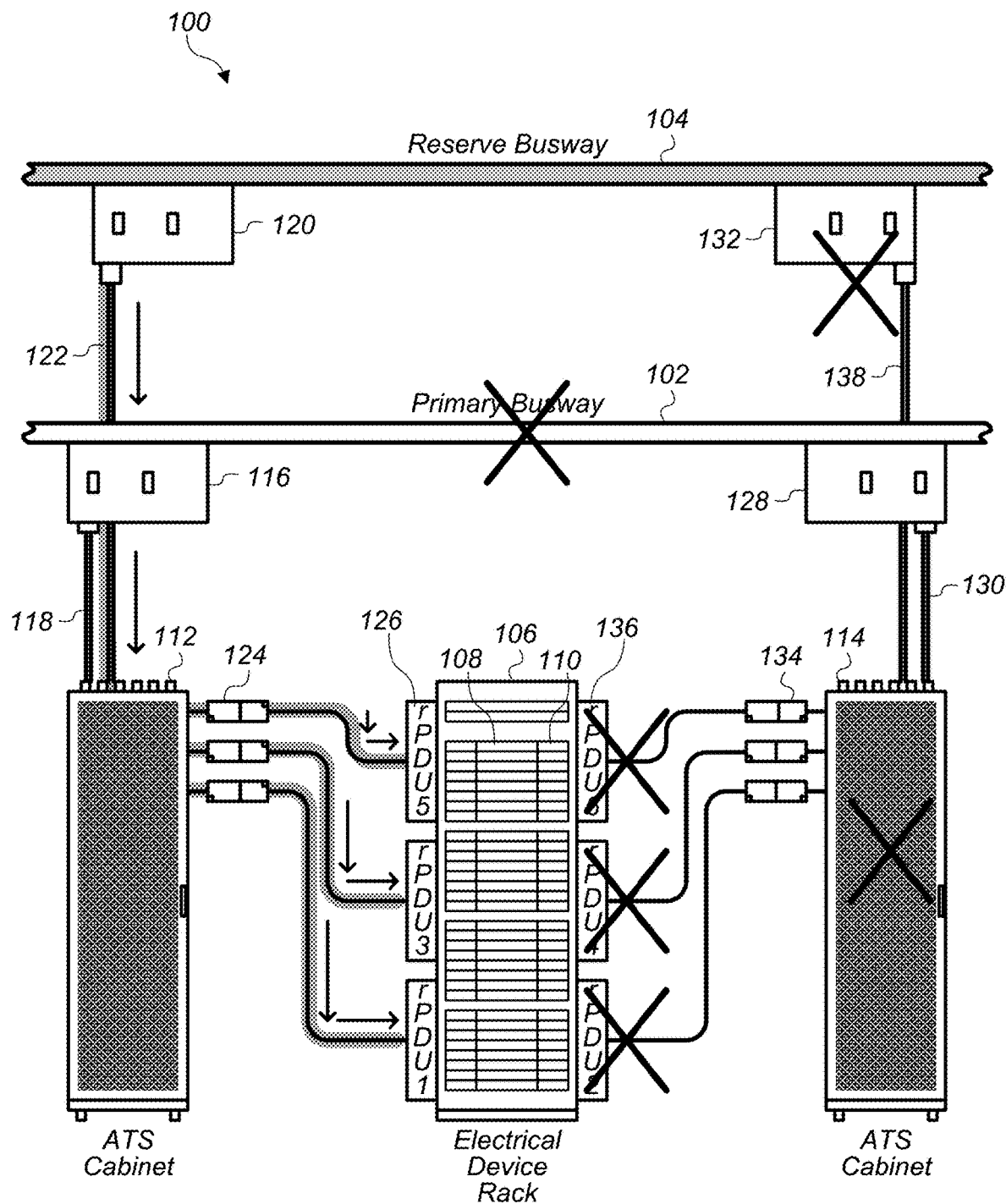
FIG. 2C illustrates electrical devices with multi-input power supplies receiving electrical power from a reserve power system via a single input of the multi-input power supplies of the electrical devices in response to a component failure downstream of the reserve power system, according to some embodiments.

FIG. 2C illustrates electrical devices with multi-input power supplies receiving electrical power from a reserve power system via a single input of the multi-input power supplies of the electrical devices in response to a component failure downstream of the reserve power system, according to some embodiments.

In the event that a downstream component downstream of a revere power system, such as reserve power busway 104 fails while feeding electrical power from reserve power busway 104, a power system for multi-input devices with shared reserve power provides an alternative power route. For example in FIG. 2C, tap box 132, whip 138, an ATS of ATS cabinet 114, ATS cabinet 114 itself, one of whips 134, or one of rack PDUs 136 may have failed. In some circumstances a single one of these components or multiple ones of these components may have failed. However, in such circumstances, a full electrical load of affected ones of electrical devices 108 may be supplied from reserve busway 104 via tap box 120, whip 122, ATSs of ATS cabinet 112, whips 124, and rack PDUs 126.

In a similar manner, a failure of a whip, tap box, ATS, or rack PDU may take place while feeding electrical power from a primary power system and in response a power system for a multi-input device with shared reserve power may supply a full electrical load of affected electrical devices from unaffected ATSs.

Figure 2D:
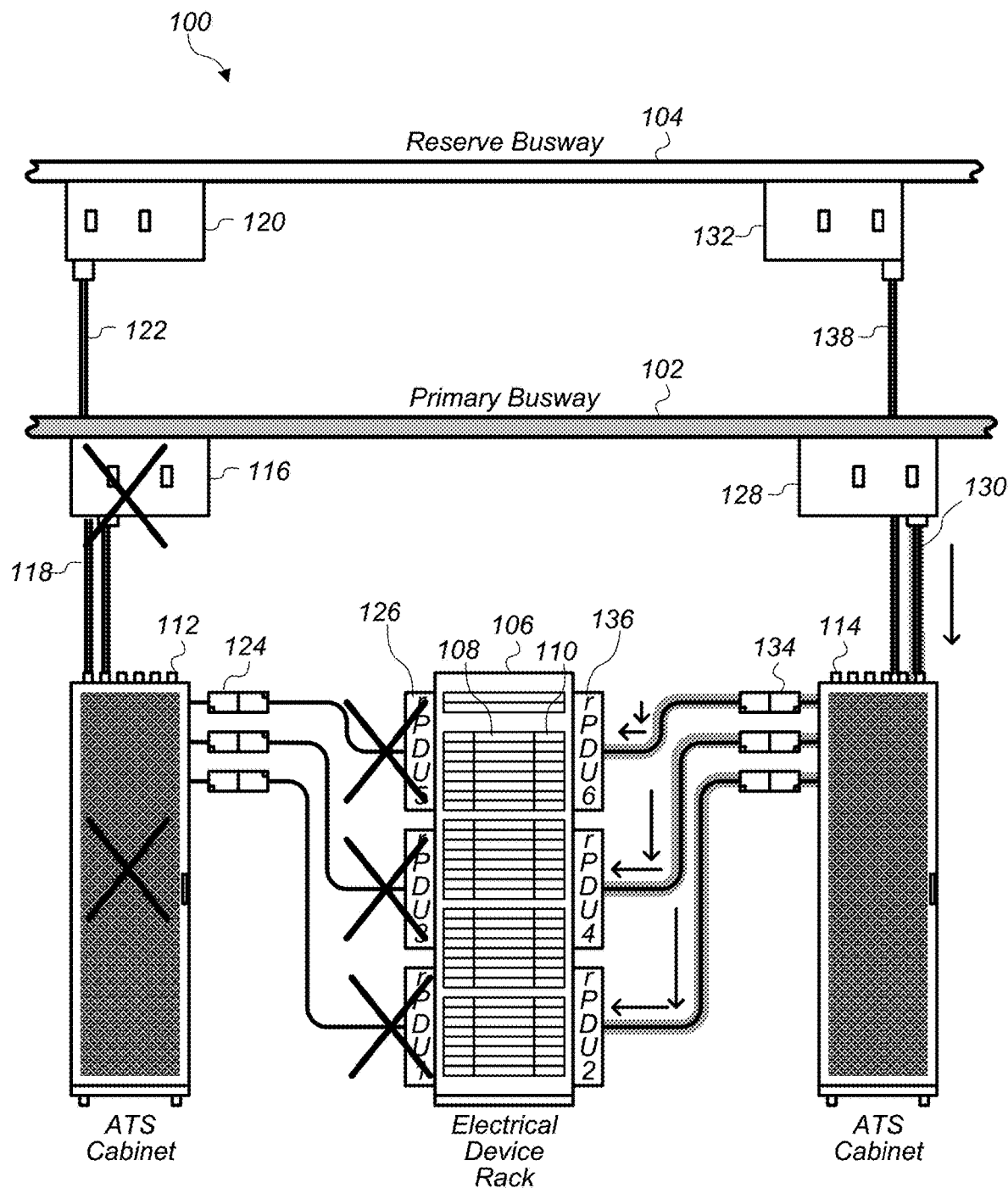
FIG. 2D illustrates electrical devices with multi-input power supplies receiving electrical power from a primary power system via a single input of the multi-input power supplies of the electrical devices, in response to a component failure downstream of the primary power system, according to some embodiments.

For example, FIG. 2D illustrates electrical devices with multi-input power supplies receiving electrical power from a primary power system via a single input of the multi-input power supplies of the electrical devices, in response to a component failure downstream of the primary power system, according to some embodiments.

In the situation illustrated in FIG. 2D, one or more of tap box 116, whip 118, ATSs of ATS cabinet 112, ATS cabinet 112 itself, whips 124, or rack PDUs 126 may have failed. In response a full electrical load of affected ones of electrical devices 108 may be fed from primary power busway 102 via tap box 128, whip 130, ATSs of ATS cabinet 114, whips 134, and rack PDUs 136.

As illustrated in FIGS. 2C and 2D, a power system for multi-input devices with shared reserve power may continue to supply power to electrical devices despite a failure at or downstream of an ATS. Also, a power system for multi-input devices with shared reserve power may continue to supply power to electrical devices despite a failure at or downstream of a connection to a primary power system or a reserve power system, such as one of tap boxes 120, 128, 116, or 128.

Figure 3:
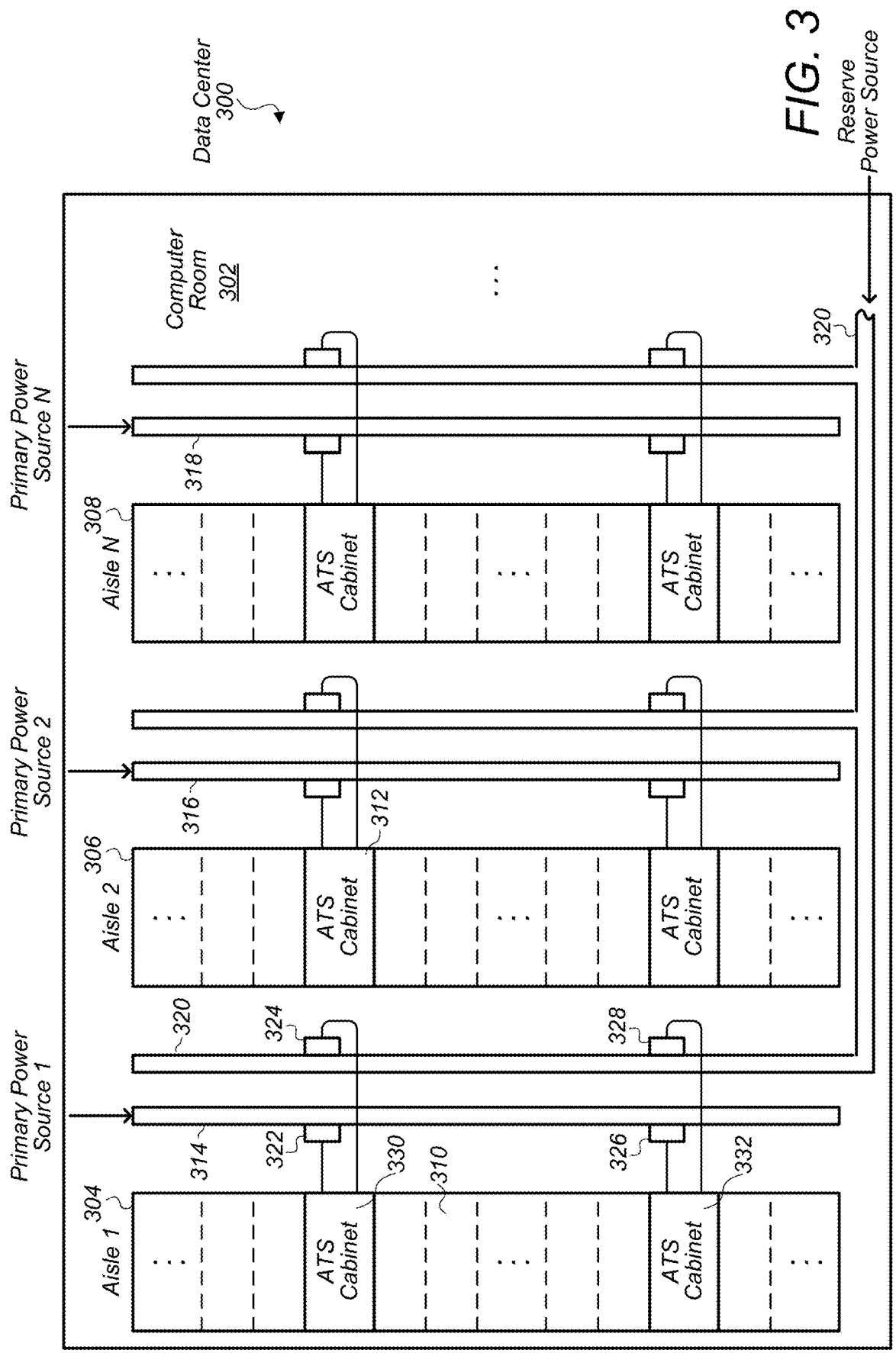
FIG. 3 illustrates a top view of a computer room of a data center comprising electrical devices with multi-input power supplies, and a power system configured to supply electrical power from single ones of multiple primary power systems to respective single sets of the electrical devices or to supply electrical power to individual ones of the sets of electrical devices from a shared reserve power system, according to some embodiments.

FIG. 3 illustrates a top view of a room of a data center comprising electrical devices with multi-input power supplies, and a power system configured to supply electrical power from single ones of multiple primary power systems to respective single sets of the electrical devices or to supply electrical power to individual ones of the sets of electrical devices from a shared reserve power system, according to some embodiments.

Computer room 302 of data center 300 includes aisle 1 (304), aisle 2 (306), and aisle(s) N (308) of racks 310 and ATS cabinets 312. Each aisle is supplied electrical power from a different primary power system. For example, aisle 1 (304) is supplied primary power from primary power system 314 that receive power from primary power source 1. Aisle 2 (306) is supplied primary power from primary power system 316 that receives power from primary power source 2, and aisle N (308) is supplied primary power from primary power system 318 that receives power from primary power source N.

Additionally, reserve power system 320 that receives power from a reserve power source provides reserve power support to electrical devices mounted in racks 310 of each of aisles 304, 306, and 308. In some embodiments, a computer room, such as computer room 302, may include any number of aisles and primary power systems, and any number of electrical devices of the aisles that receive reserve power support from a shared reserve power system, such as reserve power system 320.

In some embodiments, each primary power system may be fully independent. For example, each primary power system may include its own respective high-voltage or medium-voltage transformer and associated downstream components, such as power distribution lines, switchgear, uninterruptible power supplies, and/or power distribution units. The primary power system may receive a power feed from a utility power source at the high-voltage or medium-voltage transformer of the primary power system and may distribute the received power to electrical loads independent of other primary power systems. In some embodiments, multiple primary power system may receive high-voltage or medium-voltage power from a common utility power source, but may include independent power systems downstream of the common utility power source.

In some embodiments, a rack 310 may have a similar power system arrangement as rack 106 described in FIGS. 1 and 2. For example, tap box 322 may be a tap box 116, tap box 324 may be a tap box 120, tap box 326 may be a tap box 128, and tap box 326 may be a tap box 132 as illustrated in FIGS. 1 and 2. Also electrical devices in racks 310 may receive electrical power via multi-input power supplies coupled to different respective ATS cabinets as illustrated in FIGS. 1 and 2. For example, ATS cabinet 330 may be an ATS cabinet 112 as illustrated in FIGS. 1 and 2 and ATS cabinet 332 may be an ATS cabinet 114 as illustrated in FIGS. 1 and 2.

In some embodiments, reserve power system 320 may be oversubscribed. For example, reserve power system 320 may have a sufficient capacity to supply electrical power to electrical devices of individual ones of aisles 1, 2, or 3, but may not have a sufficient capacity to supply electrical power to all of the electrical devices of aisles 1, 2, and 3 at the same time.

In some embodiments, reserve power system 320 may be an active reserve power system that actively feed power to some electrical devices under normal operating conditions, but that has a reserved swing capacity sufficient to provide reserve power support to other electrical devices. In other embodiments, reserve power system 320 may be a passive reserve power system that does not feed electrical power to electrical devices under normal operating conditions and that is configured to supply power to respective sets of electrical devices when a primary power source for ones of the respective sets of electrical devices is not available.

In some embodiments, a primary power system may supply electrical power to any number of racks in an aisle. For example, in some embodiments an aisle may include 30 or more racks. Also, in some embodiments, a primary power system may supply electrical power to racks in multiple aisles or to racks in other configurations other than an aisle configuration.

In some embodiments, an ATS cabinet, such as ATS cabinet 330 or ATS cabinet 332 may include some ATSs that support electrical devices with single input power supplies and other ATSs that support electrical devices with multiple input power supplies.

Figure 4:
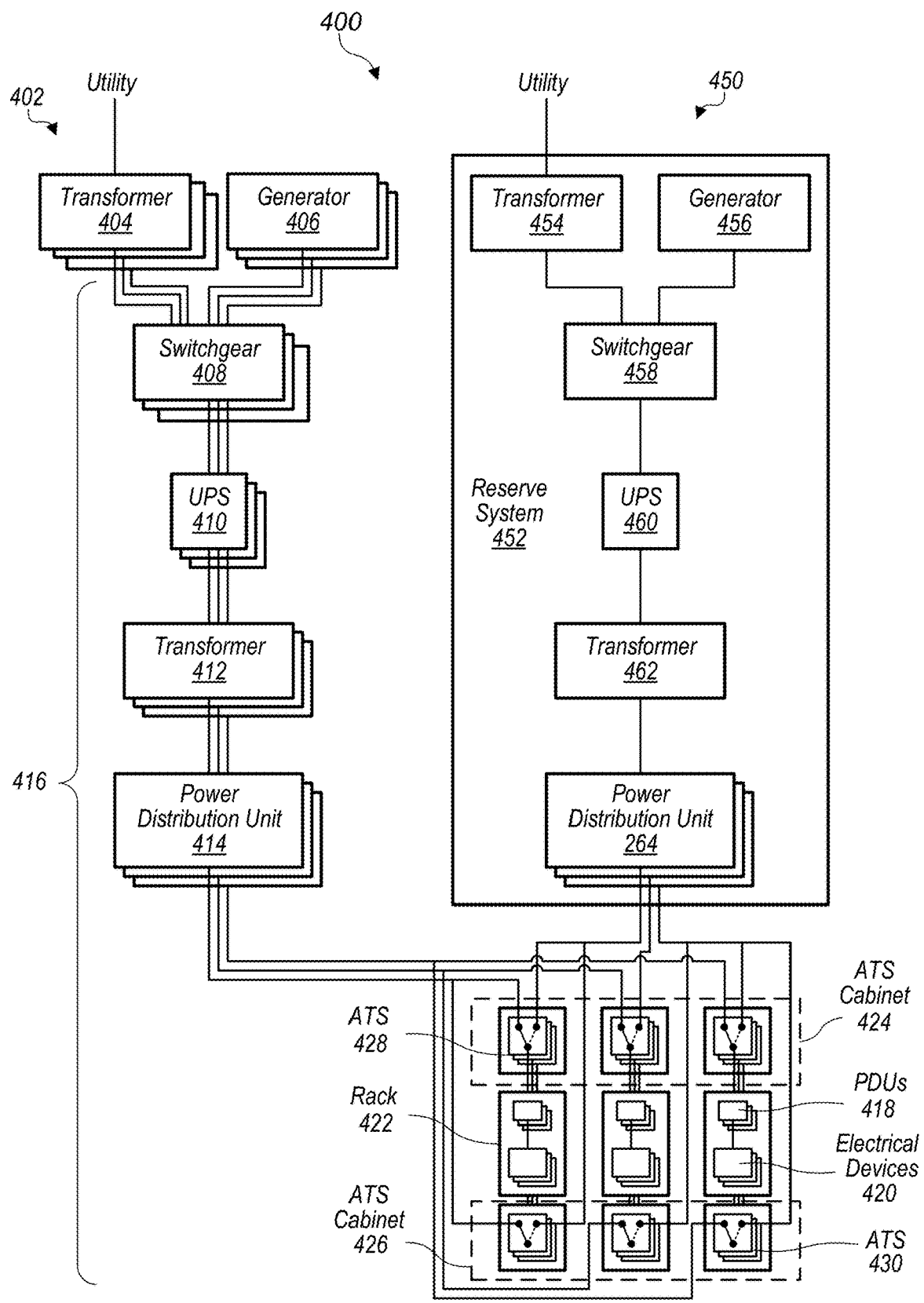
FIG. 4 is a schematic diagram illustrating components of a primary power system and a reserve power system electrically coupled to electrical devices with multi-input power supplies, according to some embodiments.

FIG. 4 is a schematic diagram illustrating components of a primary power system and a reserve power system electrically coupled to electrical devices with multi-input power supplies, according to some embodiments.

FIG. 4 illustrates an example data center 400. Data center 400 includes racks 422, primary power side 402 and reserve power side 450. Reserve power side 450 includes reserve power system 452.

Primary power side 402 includes multiple primary power systems 416. For example three primary power systems are illustrated in FIG. 4. However, in some embodiments a primary power side 402 may include more or fewer primary power systems. Sets of computer systems 420 in racks 422 may perform computing operations in data center 400 or networking operations in data center 400. Computer systems 420 may be, for example, servers in a server room of data center 400 or networking devices in a networking room of data center 400. Computer systems 420 in racks 422 may each receive power from one of primary power systems 416. In one embodiment, each of primary power systems 416 corresponds to, and provides power to, the servers in one room in data center 400.

Primary power systems 416 each include a respective one of transformers 404, generators 406, and switchgears 408. Primary power systems 416 also each include uninterruptible power sources (UPSs) 410, transformers 412, and floor power distribution units 414 that provide power to various racks 422. In some embodiments, floor power distribution units 414 include transformers that transform the voltage from switchgear 408. For example, in some embodiments, transformers 412 are included in floor power distribution units 414. Each of racks 422 may include one or more rack power distribution units (PDUs) 418.

Transformers 404 are coupled to a utility feed. The utility feed may be a high-voltage or medium-voltage feed. In certain embodiments, the utility feed is at a voltage of about 13.5 kilovolts or 12.8 kilovolts at a frequency of about 60 Hz. Generators 406 may provide power to primary power systems 416 in the event of a failure of utility power to transformers 404. In one embodiment, one of generators 406 provides back-up power for each of primary power systems 416.

Reserve power system 452 may provide reserve power for all of the computer systems 420 supplied by primary power systems 416. In some embodiments, reserve power system 452 is powered up at all times during operation of data center 400. Reserve power system 452 may be passive until a failure of one or more components of primary power side 402, at which time reserve power system 452 may become active.

For illustrative purposes, three primary power systems are shown in FIG. 4 (for clarity, details of only the front primary power system 416 are shown). The number of primary power systems 416 on primary power side 402 may vary, however. In certain embodiments, a primary power side may include fewer or more primary power systems. In addition, the number of transformers, generators, switchgears, UPSs, downstream transformers, and power distribution units may vary from embodiment to embodiment (and, within a given embodiment, from system to system). In some embodiments, primary power system 416 includes many floor power distribution units 414.

Reserve power system 452 includes transformer 454 and generator 456. Transformer 454 may supply power to switchgear 458. Floor power distribution unit 464 may receive power from switchgear 458.

Primary power system 416 includes isolation transformer 412 and reserve power system 452 includes isolation transformer 462. Isolation transformers 412 and 462 may isolate downstream loads such as computer systems 420 from noise or harmonics in primary power systems 416 and reserve power system 452. In some embodiments, isolation transformers, such as isolation transformer 412 or 462, may be included in a power distribution unit, such as floor power distribution unit 414 or 264.

Primary power system 416 also includes UPS 410 and reserve power system 452 includes UPS 460. Because under normal operations a full load of electrical devices 420 is supplied from primary power systems 416, electrical loading of UPSs 410 may be greater than would be the case in a "2N" system. Also, UPS 460 of reserve power system 452 may have a sufficient capacity to support one of primary power systems 416, for example while a generator 456 of reserve power system 452 is put into operation, but may not have a sufficient capacity to support all of primary power systems 416.

Data center 400 also includes ATS cabinet 426 comprising ATSs 430 and ATS cabinet 424 comprising ATSs 428. ATSs 428 may be electrically coupled at a first input to one of primary power systems 416 and electrically coupled at a second input to reserve power system 452. Also ATSs 428 may be electrically coupled at an outlet to a whip connected on one or rack PDUs 418 that is in turn electrically coupled to respective first inputs of one or more electrical devices 420. Additionally, ATSs 430 may be electrically coupled at a first input to one of primary power systems 416 and electrically coupled at a second input to reserve power system 452. Also ATSs 430 may be electrically coupled at an outlet to a whip connected on one or rack PDUs 418 that is in turn electrically coupled to respective second inputs of one or more electrical devices 420.

In some embodiments, ATSs 428 and ATSs 430 may be mounted in different ATS cabinets 424 and 426 as shown in FIG. 4 or may be mounted in a common ATS cabinet.

Figure 5:
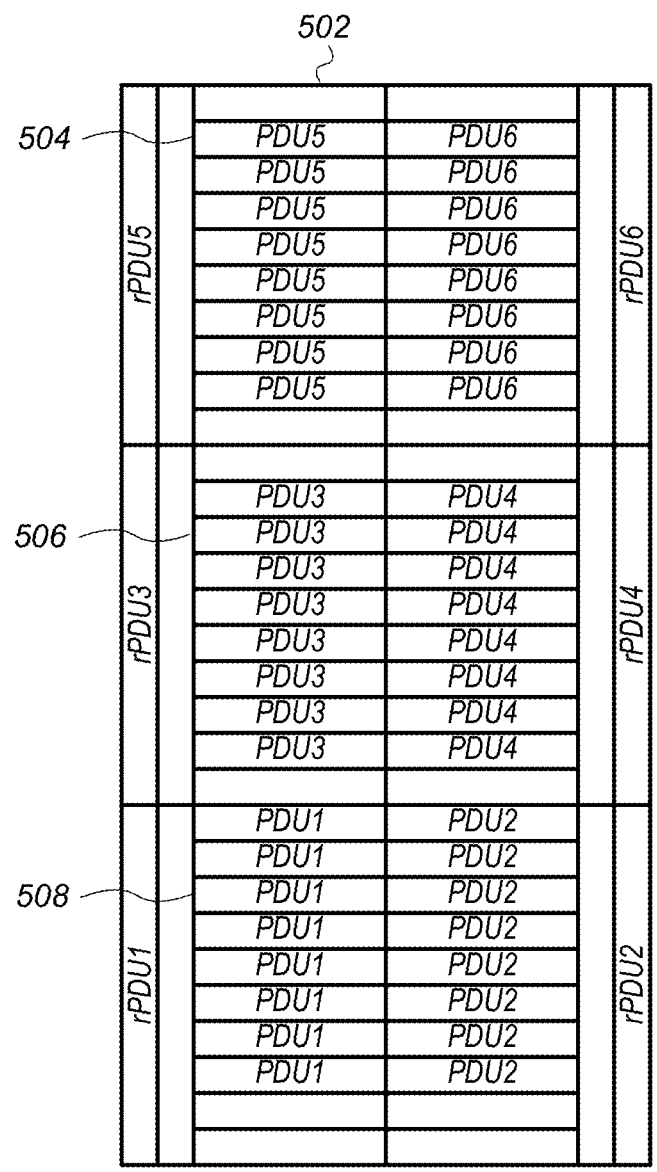
FIG. 5 is a schematic diagram illustrating power connections for multi-input power supplies of electrical devices mounted in a rack, according to some embodiments.

FIG. 5 is a schematic diagram illustrating power connections for multi-input power supplies of electrical devices mounted in a rack, according to some embodiments.

As illustrated in FIG. 5 respective electrical devices with multi-input power supplies may each be coupled to a set of two rack PDUs that receive electrical power from different ATSs, such as ATSs 428 and 430 described in FIG. 4 or different ATSs of ATS cabinets as described in FIGS. 1-3. For example, electrical devices 504 mounted in rack 502 are electrically coupled to both rack PDU 5 and rack PDU 6. Also, other electrical devices 506 mounted in rack 502 are electrically coupled to both rack PDU 3 and rack PDU 4. Also, additional electrical devices 508 mounted in rack 502 are electrically coupled to both rack PDU 1 and rack PDU 2. In some embodiments, rack PDUs 1, 3, and 5 may be electrically coupled to ATSs in a first ATS cabinet and rack PDUs 2, 4, and 6 may be electrically coupled to ATSs in a second ATS cabinet, wherein each ATS cabinet is electrically coupled to a primary power system and a reserve power system via separate connections, such as separate tap boxes and whips. In some embodiments, rack PDUs 1-6 may be electrically coupled to ATSs in a same ATS cabinet, wherein ATSs electrically coupled to rack PDUs 1, 3, and 5 are separately connected to a primary power system and a reserve power system than are ATSs electrically coupled to rack PDUs 2, 4, and 6.

Note that FIG. 5 is an example arrangement of multi-input electrical devices in a rack. In some embodiments, a rack may include more or fewer electrical devices or rack PDUs. Also, in some embodiments, a rack may include both single input electrical devices and electrical devices with multi-input power supplies.

Figure 6:
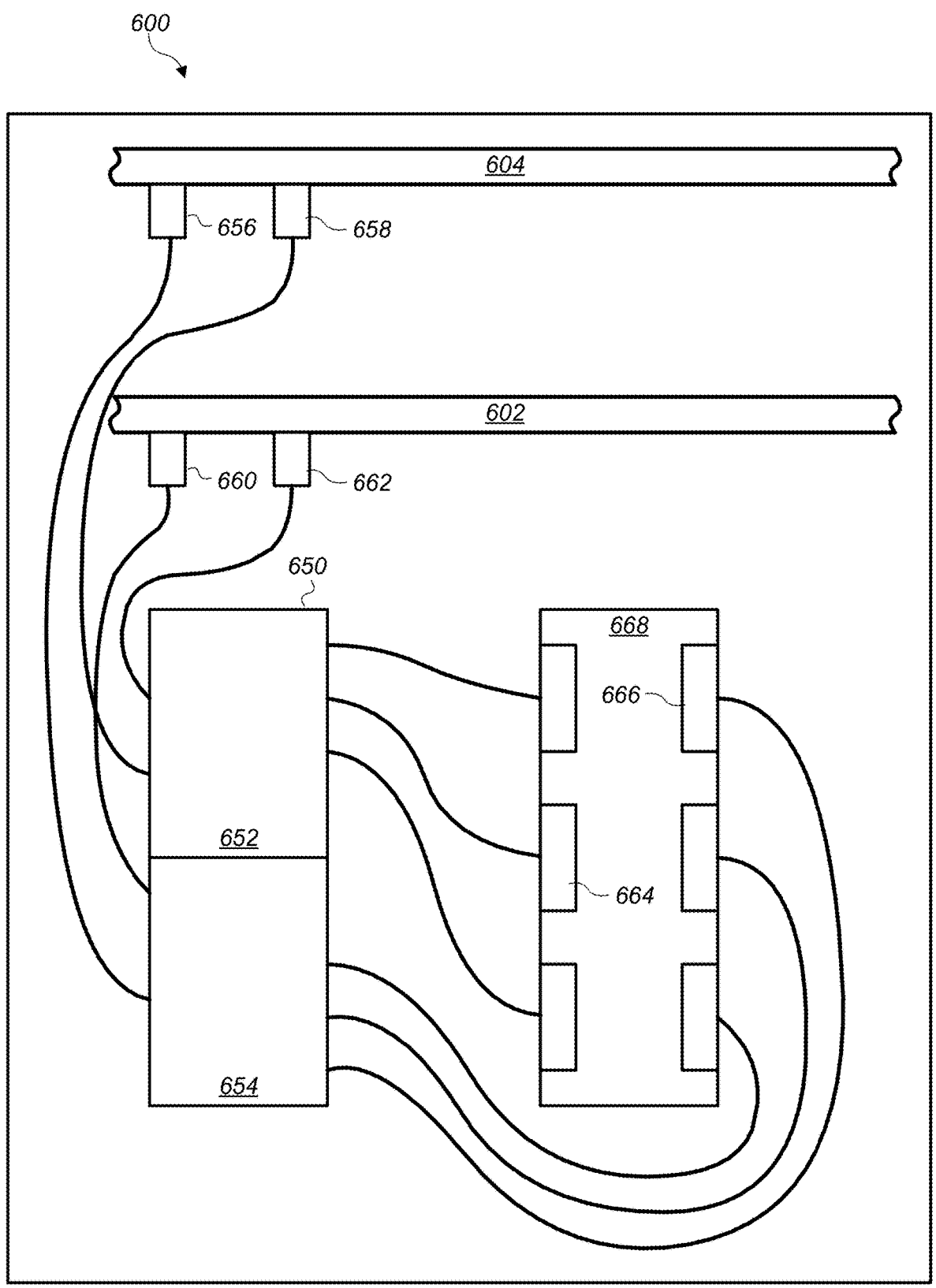
FIG. 6 illustrates a power system comprising an automatic transfer switch cabinet that includes multiple sets of automatic transfer switches each coupled to a primary power system and a reserve power system mounted in a common cabinet, according to some embodiments.

FIG. 6 illustrates a power system comprising an automatic transfer switch cabinet that includes multiple sets of automatic transfer switches each coupled to a primary power system and a reserve power system mounted in a common cabinet, according to some embodiments.

Data center 600 includes a primary power system 602 and a reserve power system 604. ATS cabinet 650 includes two parts, part 652 and part 654. ATSs mounted in part 652 are connected to primary power system 602 and reserve power system 604 via connections 662 and 658. Also, ATSs mounted in part 654 are connected to primary power system 602 and reserve power system 604 via connections 660 and 656. In this way a failure of one of the connections, such as one of connections 656, 658, 660, or 662 only affects ATSs in one of the two parts of ATS cabinet 652. Additionally ATSs in part 652 are electrically coupled to rack PDUs 664 and ATSs in part 654 are electrically coupled to rack PDUs 666. Electrical devices mounted in rack 668 may be connected via respective first inputs to rack PDUs 664 and via respective second inputs to rack PDUs 666. Thus the electrical devices mounted in rack 668 have are connected to primary power system 602 and reserve power system 604 via independent electrical paths.

Figure 7:
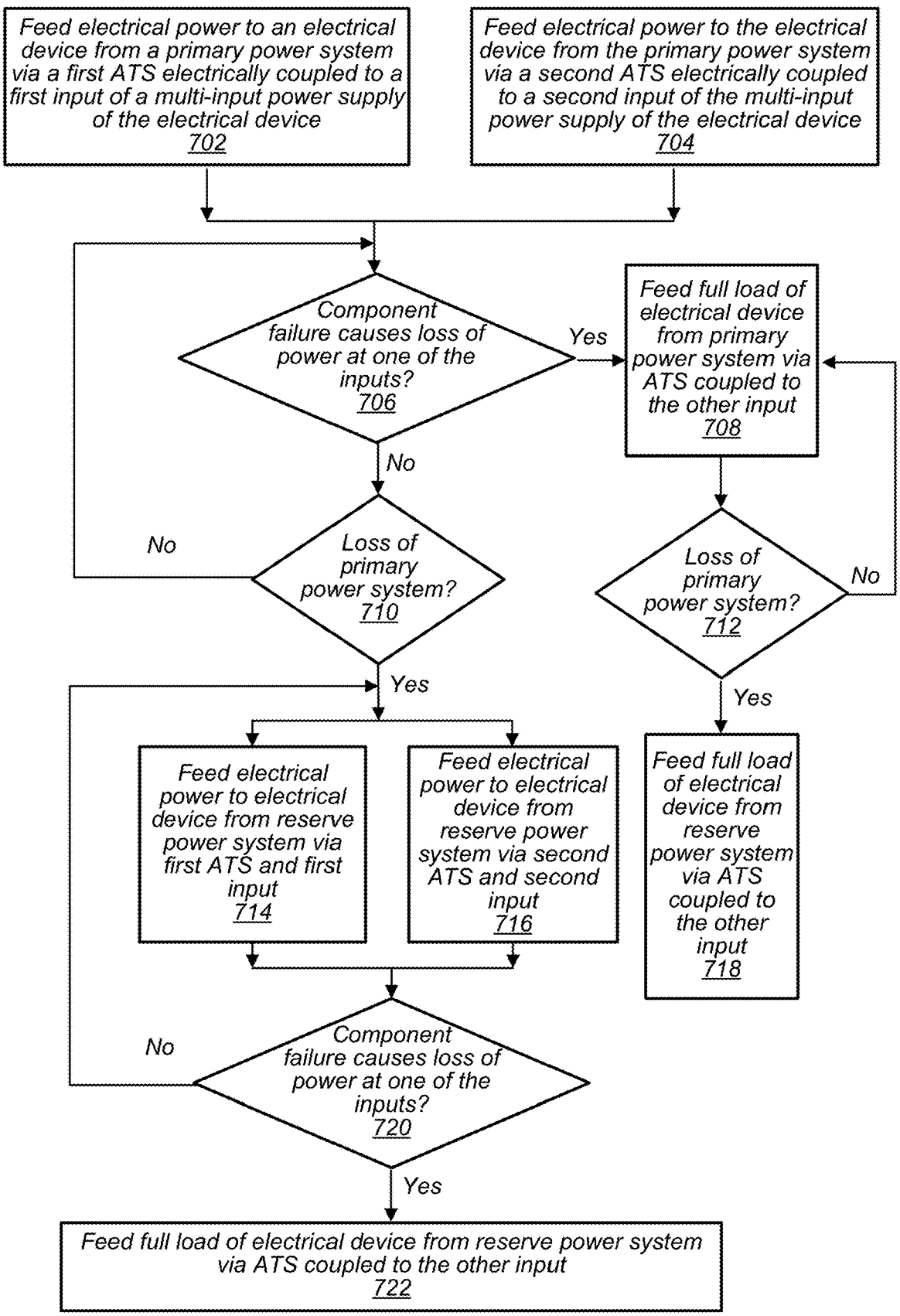
FIG. 7 is a flow diagram illustrating operations of a power system for multi-input electrical devices with shared reserve power in response to various system or component failures, according to some embodiments.

FIG. 7 is a flow diagram illustrating operations of a power system for multi-input electrical devices in response to various system or component failures, according to some embodiments.

At 702 and at 704 electrical power is concurrently fed to an electrical device from a primary power system via both a first ATS electrically coupled to a first input of the electrical device and a second ATS electrically coupled to a second input of the electrical device. For example, the electrical device, may include a multi-input power supply having more than one input. In some embodiments, a multi-input power supply may be dual corded wherein two cords connect to the same power supply. In such embodiments, respective ones of the dual cords may be connected to different respective rack PDUs that receive power from different respective ATS that are separately electrically coupled to a primary power system and a reserve power system.

At 706, it is detected whether a component failure has caused a loss of power at one of the inputs to one of the electrical devices. For example a cord failure, a rack PDU failure, a whip failure for a whip that connects an ATS to a rack PDU, a ATS failure, an ATS cabinet failure, a whip failure for a whip that connects an ATS cabinet to a tap box, or a tap box failure may cause a loss of power at one or more inputs of an electrical device. Such a loss of power may occur even if primary power is available at a primary power system, such as a primary power bus. In some embodiments, 706 may be automatically performed due to the arrangement of the power system for multi-input devices with shared reserve power without a processor making a determination that a component has failed.

If a component failure has caused a loss of power at one of the inputs of one or more of the electrical devices, at 708, the one or more electrical devices may feed their full load from the primary power system via other inputs of the multi-input power supplies of the one or more electrical loads, such as respective second inputs of multi-input power supplies of the electrical devices.

At 712, it is detected whether primary power from a primary power system has been lost. In some embodiments an automatic transfer switch may automatically detect that primary power has been lost and automatically switch to feed power from a reserve power system. For example, at 718 a full load of the one or more electrical devices is fed from a reserve power system via the ATS coupled to the input that is able to receive power from the ATS.

If no component failure is detected at 706, the power system for multi-input devices with shared reserve power may continue to feed electrical power to supported electrical devices via dual ATSs separately connected to a primary power system and a reserve power system.

At 710, in response to a loss of primary power from the primary power system, the dual ATSs may selectively switch to feed reserve power to the one or more electrical devices. For example at 714 and 716 electrical power is concurrently fed to the one or more electrical devices from the reserve power system via a first ATS coupled to a first input of the electrical devices and via a second ATS coupled to a second input of the electrical devices. If a loss of primary power is not detected at 706, the power system for multi-input devices with shared reserve power continues to feed primary power to the electrical devices.

At 720, it is detected whether a component failure has caused a loss of power from the reserve power system at one of the inputs to one of the electrical devices. For example a cord failure, a rack PDU failure, a whip failure for a whip that connects an ATS to a rack PDU, a ATS failure, an ATS cabinet failure, a whip failure for a whip that connects an ATS cabinet to a tap box, or a tap box failure may cause a loss of power at one or more inputs of an electrical device. Such a loss of power may occur even if reserve power is available at a reserve power system, such as a reserve power bus. In some embodiments, 706 may be automatically performed due to the arrangement of the power system for multi-input devices with shared reserve power without a processor making a determination that a component has failed.

If a component failure has caused a loss of power at one of the inputs of one or more of the electrical devices, at 722, the one or more electrical devices may feed their full load from the reserve power system via other inputs of the one or more electrical loads, such as respective second inputs of multi-input power supplies of the electrical devices.

If a loss of primary power is not detected at 720, the power system for multi-input devices with shared reserve power continues to feed reserve power to the electrical devices.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A data center, comprising:
   aisles of racks, wherein respective ones of the racks comprise electrical devices that comprise multi-input power supplies,
   wherein the multi-input power supplies of the respective electrical devices are configured to:
      receive power from a first input of the respective multi-input power supply via a first automatic transfer switch of a first group of automatic transfer switches;
      receive power from a second input of the respective multi-input power supply via a second automatic transfer switch of a second group of automatic transfer switches; and
      convert the power received from the first and second inputs of the respective multi-input power supply into direct current (DC) power usable to power the respective electrical device that includes the respective multi-input power supply;
   primary electrical power systems configured to supply electrical power to the electrical devices, wherein electrical devices mounted in racks in different ones of the aisles are supplied electrical power from different ones of the primary electrical power systems;

a reserve power system configured to provide reserve power support to electrical devices mounted in multiple ones of the aisles;

the first group of automatic transfer switches associated with one of the aisles configured to receive power from one of the primary electrical power systems or the reserve power system and supply the received power to respective ones of the electrical devices via the respective first inputs of the respective multi-input power supplies of the respective electrical devices; and the second group of automatic transfer switches, associated with the one of the aisles, configured to receive power from the same one of the primary electrical power systems or the reserve power system and supply the received power to the respective ones of the electrical devices via the respective second inputs of the respective multi-input power supplies of the respective electrical devices, wherein in response to a failure at an automatic transfer switch in the first group or the second group, the automatic transfer switches of the other one of the first group or the second group are configured to:

feed a full electrical load to the respective ones of the electrical devices via one of the inputs of the respective multi-input power supplies of the respective electrical devices.

2. The data center of claim 1, wherein the first group of automatic transfer switches and the second group of automatic transfer switches are configured to concurrently feed electrical power to the respective electrical devices of the one of the aisles via the respective first and second inputs of the respective multi-input power supplies of the respective electrical devices.

3. The data center of claim 2, wherein, in response to a loss of power from the one of the primary electrical power systems:

the automatic transfer switches of the first group are configured to automatically switch to feed electrical power from the reserve power system, and the automatic transfer switches of the second group are configured to automatically switch to feed electrical power from the reserve power system, wherein the automatic transfer switches of the first group and the automatic transfer switches of the second group are configured to concurrently feed electrical power from the reserve power system to the respective electrical devices of the one of the aisles via the respective first and second inputs of the respective multi-input power supplies of the respective electrical devices.

4. The data center of claim 1, wherein the electrical devices are:

a computing device; or a networking device.

5. A system comprising:

an electrical device comprising a multi-input power supply, wherein the multi-input power supply is configured to:

receive power from a first input of the multi-input power supply via a first automatic transfer switch;

receive power from a second input of the multi-input power supply via a second automatic transfer switch; and convert the power received from the first and second inputs of the multi-input power supply into direct current (DC) power usable to power the electrical device that includes the multi-input power supply;

a primary electrical power system configured to supply electrical power to the electrical device;

a reserve power system configured to provide reserve power support to the electrical device;

the first automatic transfer switch electrically coupled to the primary electrical power system and the reserve power system, wherein the first automatic transfer switch is electrically coupled to the electrical device via the first input of the multi-input power supply of the electrical device; and the second automatic transfer switch electrically coupled to the primary electrical power system and the reserve power system, wherein the second automatic transfer switch is electrically coupled to the electrical device via the second input of the multi-input power supply of the electrical device, wherein in response to a failure at the first automatic transfer switch or at the second automatic transfer switch, the other one of the automatic transfer switches is configured to:

feed a full electrical load to the electrical device via one of the inputs of the multi-input power supply of the electrical device.

6. The system of claim 5, wherein the first automatic transfer switch and the second automatic transfer switch are configured to concurrently feed electrical power to the electrical device via the first and second inputs of the multi-input power supply of the electrical device.

7. The system of claim 6, wherein in response to a loss of power from the primary electrical power system:

the first automatic transfer switch is configured to automatically switch to feed electrical power from the reserve power system, and the second automatic transfer switch is configured to automatically switch to feed electrical power from the reserve power system, wherein the first and second automatic transfer switches are configured to concurrently feed electrical power from the reserve power system to the electrical device via the first and second inputs of the multi-input power supply while power is not available from the primary electrical power system.

8. The system of claim 5, wherein the multi-input power supply of the electrical device is a dual corded power supply.

9. The system of claim 7, wherein the reserve power system is configured to provide reserve power support to other electrical devices, wherein a total power requirement of the electrical device and the other electrical devices exceeds a capacity of the reserve power system to supply power.

10. The system of claim 5, wherein the primary electrical power system comprises an uninterruptible power supply (UPS) coupled in the primary electrical power system upstream of the first automatic transfer switch and the second automatic transfer switch, wherein the UPS is configured to provide uninterruptible power support for electrical power being fed to the electrical device via the first automatic transfer switch and via the second automatic transfer switch.

11. The system of claim of claim 5, further comprising:

a rack, wherein the electrical device is mounted in the rack;

additional electrical devices mounted in the rack that comprise multi-input power supplies; and rack power distribution units (PDUs), wherein one of the rack PDUs is coupled to the first automatic transfer switch and a second one of the rack PDUs is coupled to the second automatic transfer switch;

wherein the electrical device and the additional electrical devices are coupled to the first rack PDU and are coupled to the second rack PDU and are configured to concurrently receive electrical power from the first rack PDU and the second rack PDU via respective inputs of the multi-input power supplies of the electrical devices.

12. The system of claim 5, wherein the first automatic transfer switch and the second automatic transfer switch are mounted in different respective automatic transfer switch cabinets.

13. The system of claim 5, wherein the reserve power system is configured to:
  feed electrical power to the electrical device or other electrical devices in response to a loss of primary power, and
  not feed electrical power to the electrical device or the other electrical devices while primary power is available.

14. The system of claim 5, wherein the reserve power system is configured to:
  feed electrical power to the electrical device or other electrical devices in response to a loss of primary power, and
  feed electrical power to at least some of the electrical device or the other electrical devices while primary power is available, wherein an amount of power fed to the at least some electrical devices is less than a reserved capacity of the reserve power system that is reserved to provide reserve power support to the electrical device.

15. The system of claim 5, wherein the electrical device comprises a router, a switching device, a compute server, or a storage server.

16. A method comprising:
  feeding electrical power to an electrical device from a primary power system via a first automatic transfer switch coupled to the primary power system and feeding electrical power to the electrical device from the primary power system via a second automatic transfer switch coupled to the primary power system, wherein the power is fed to the electrical device via a multi-input power supply of the electrical device, wherein the multi-input power supply is configured to:
    receive power from a first input of the multi-input power supply via the first automatic transfer switch;
    receive power from a second input of the multi-input power supply via the second automatic transfer switch; and
    convert the power received from the first and second inputs of the multi-input power supply into direct current (DC) power usable to power the electrical device that includes the multi-input power supply; and
  feeding, in response to a failure at the first automatic transfer switch or at the second automatic transfer switch, a full electrical load to the electrical device via the multi-input power supply and a remaining non-failed one of the first automatic transfer switch or the second automatic transfer switch coupled to the first or second input of the multi-input power supply.

17. The method of claim 16, wherein said feeding electrical power to the electrical device via the first automatic transfer switch and via the second automatic transfer switch comprises:
  concurrently feeding electrical power to the electrical device via the first input of the multi-input power supply of the electrical device coupled to the first automatic transfer switch and via the second input of the multi-input power supply coupled to the second automatic transfer switch.

18. The method of claim 16, further comprising:
  prior to the failure at the first or second automatic transfer switch, feeding, in response to a loss of power from the primary power system, electrical power to the electrical device from a reserve power system via the first automatic transfer switch and via the second automatic transfer switch.

19. The method of claim 18, wherein the remaining one of the first or second automatic transfer switches receives the electrical power being fed from the reserve power system.

20. The method of claim 16, wherein the remaining one of the first or second automatic transfer switches receives the electrical power being fed from the primary power system.

* * * * *